United States Patent
Rofougaran

(10) Patent No.: US 9,591,695 B2
(45) Date of Patent: Mar. 7, 2017

(54) METHOD AND SYSTEM FOR SHARING MODULATION INFORMATION BETWEEN MULTIPLE ACCESS POINTS

(75) Inventor: Ahmadreza Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 1722 days.

(21) Appl. No.: 12/033,294

(22) Filed: Feb. 19, 2008

(65) Prior Publication Data

US 2009/0209208 A1 Aug. 20, 2009

(51) Int. Cl.
*H04B 1/00* (2006.01)
*H04B 7/00* (2006.01)
*H04W 92/20* (2009.01)
*H04B 7/08* (2006.01)
*H04B 7/12* (2006.01)

(52) U.S. Cl.
CPC ........... *H04W 92/20* (2013.01); *H04B 7/0848* (2013.01); *H04B 7/12* (2013.01)

(58) Field of Classification Search
USPC ....... 455/418–420, 41.2, 500–502, 507–513, 455/63.1, 522, 67.11, 67.13, 68–71, 561, 455/114.2, 296, 450, 452.1, 452.2
See application file for complete search history.

(56) References Cited

U.S. PATENT DOCUMENTS

| | | | | |
|---|---|---|---|---|
| 7,130,595 B1* | 10/2006 | Mohindra | ................... | 455/127.1 |
| 7,599,686 B2* | 10/2009 | Quinn et al. | .................. | 455/423 |
| 7,738,877 B2* | 6/2010 | Amos | ............................ | 455/454 |
| 7,792,076 B2* | 9/2010 | Lee et al. | ...................... | 370/329 |

\* cited by examiner

*Primary Examiner* — Tuan A Tran
(74) *Attorney, Agent, or Firm* — Oblon, McClelland, Maier & Neustadt, L.L.P.

(57) ABSTRACT

Aspects of a method and system for sharing modulation information between multiple access points may include receiving modulation control information and demodulation control information at an access point comprising one or more receivers and one or more transmitters. One or more modulation frequencies may be adjusted and utilized to generate transmit signals by the one or more transmitters based on the received modulation control information. One or more demodulation frequencies may be adjusted and utilized to generate intermediate frequency signals by the one or more receivers based on the received demodulation control information. The modulation control information and the demodulation control information may be received via a control point. The modulation control information and demodulation control information may be received on a link operating in a frequency band different from said transmit frequencies and said receive frequencies.

19 Claims, 4 Drawing Sheets

METHOD AND SYSTEM FOR SHARING MODULATION INFORMATION BETWEEN MULTIPLE ACCESS POINTS

CROSS-REFERENCE TO RELATED APPLICATIONS/INCORPORATION BY REFERENCE

Not applicable.

FIELD OF THE INVENTION

Certain embodiments of the invention relate to signal processing for communication systems. More specifically, certain embodiments of the invention relate to a method and system for sharing modulation information between multiple access points.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices. The various communications may occur at different transmission and/or reception bands.

Given the varying demands of users, service providers and device manufacturers have to support media content comprising voice, video and/or data compliant with many different communication standards, specifications and/or data formats.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for sharing modulation information between multiple access points, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing information modulation information between multiple access points. Aspects of a method and system for sharing information modulation information between multiple access points may comprise receiving modulation control information and demodulation control information at an access point comprising one or more receivers and one or more transmitters. One or more modulation frequencies may be adjusted and utilized to generate transmit signals by the one or more transmitters based on the received modulation control information. One or more demodulation frequencies may be adjusted and utilized to generate intermediate frequency signals by the one or more receivers based on the received demodulation control information.

The modulation control information and the demodulation control information may be received via a control point. The modulation control information and demodulation control information may be received on a link operating in a frequency band different from said transmit frequencies and said receive frequencies. The frequency band of the link may be Bluetooth or a IEEE 802.11 Wireless Link. One or more of the one or more modulation frequencies and the one or more demodulation frequencies may be substantially similar. The transmit frequencies and the receive frequencies may be in the 60 GHz band. A plurality of the intermediate frequency signals received via a plurality of antennas may be combined. Intermediate frequency signals may be generated for the one or more transmitters in accordance with multiple antenna transmission protocols. Radio frequency interference may be reduced during the adjustment of the receive frequencies and the adjustment of the transmit frequencies.

Figure 1:
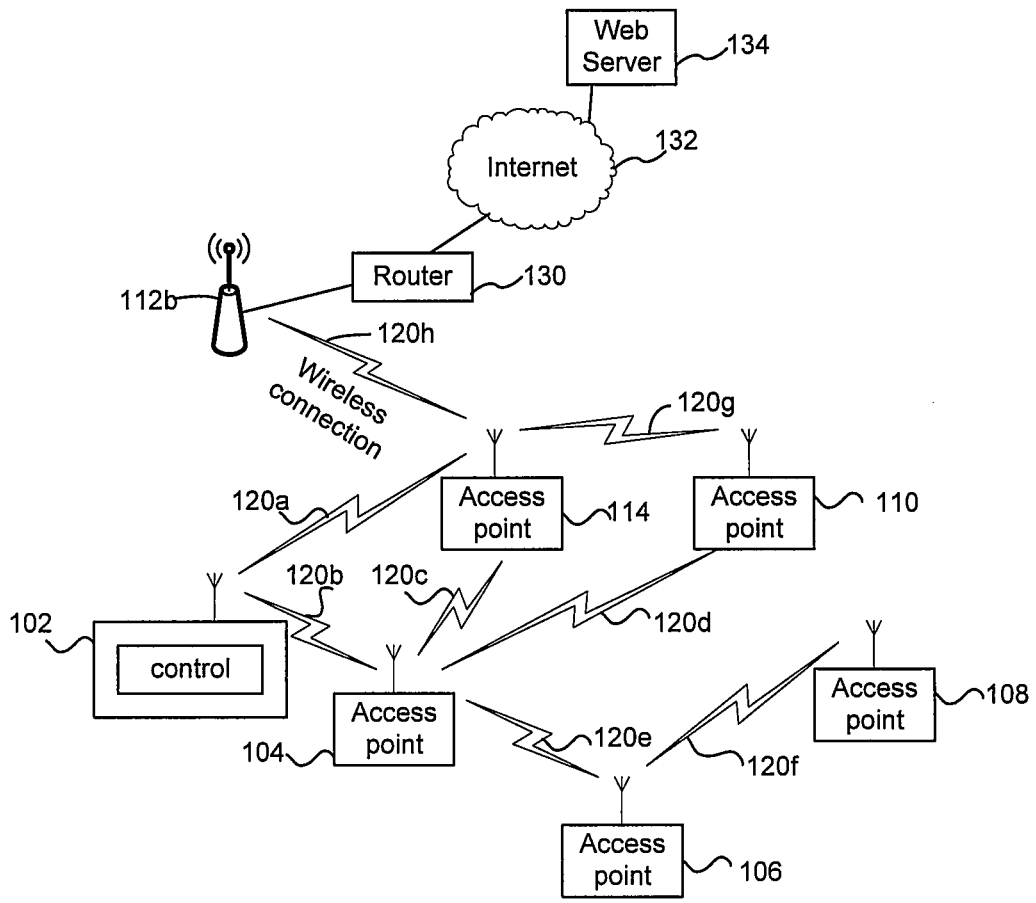
FIG. 1 is a diagram illustrating an exemplary wireless communication system, in accordance with an embodiment of the invention.

FIG. 1 is a diagram illustrating an exemplary wireless communication system, in accordance with an embodiment of the invention. Referring to FIG. 1, there is shown an access point 112b, a router 130, the Internet 132, a web server 134, access points 104, 106, 108, 110, and 114, a control point 102, wireless connections 120a, 120b, 120c, 120d, 120e, 120f, 120g, and 120h.

The access points 104, 106, 108, 110, and 114 may be substantially similar and may comprise suitable logic, circuitry and/or code that may be enabled to receive, process, and transmit radio signals. In accordance with various embodiments of the invention, the access points 104, 106, 108, 110, and 114 may be arranged and/or configured so as to form a mesh network. Each access point may be enabled to communicate with one or more other access points and/or the control point 102. In some instances, an access point may be communicating with other network components, for example access point 114 may be communicatively coupled to access point 112b via the wireless connection 120h. A plurality of exemplary wireless connections between the access points 104, 106, 108, 110, and 114 and the control point 102 may be illustrated by the wireless connections 120a, 120b, 120c, 120d, 120e, 120f, 120g, and 120h.

The control point 102 may comprise suitable logic, circuitry and/or code that may be enabled to send and receive control signals to/from the access points to control transmission frequency and/or networking, in accordance with an embodiment of the invention.

The access point 112b may comprise suitable logic, circuitry and/or code that may be enabled to transmit and receive radio frequency signals for communication of information comprising voice, video and/or data, for example, via the access point 114. The access point 112b may also be enabled to communicate via a wired network, for example, with the router 130. The wireless access points 104, 106, 108, 110, and 114 and the access point 112b may be compliant with one or more communication standard, for example, Wireless LAN (WLAN, IEEE 802.11 or variants thereof or Bluetooth.

The router 130 may comprise suitable logic, circuitry and/or code that may be enabled to route communication between, for example, a wide area network (WAN) and/or a LAN or WLAN. The access point 112b and the Internet 132 may be coupled to the router 130. In this regard, the router 132 may be enabled to route traffic between the Internet and devices communicatively coupled to a WLAN via the access point 112b.

The Internet 132 may comprise various devices comprising suitable logic, circuitry and/or code that may enable interconnection and exchange of data between a plurality of communication devices communicatively coupled thereto. The web server 134 may comprise suitable logic, circuitry and/or code that may be communicatively coupled to the Internet 132 and may be enabled to provide web-based services to various communication devices that may be communicatively coupled to it. For example, the web server 134 may host one or more web sites that may be accessible via the communication devices.

In accordance with various embodiments of the invention, it may be desirable that the access points 104, 106, 108, 110, and 114 may maintain a plurality of communication session concurrently. For example, a plurality of wireless connections 120a, 120b, 120c, 120d, 120e, 120f, 120g, and 120h may be active an any given time instant. For example, access point 106 may receive data via wireless connection 120e and it may be desirable to forward this data to access point 108, via wireless connection 120f. In these instances, better performance and more optimal operation may be achievable if the wireless connection 120e and the wireless connection 120f may not be operated on the same transmission frequency, because it may reduce interference. This may be achieved by using repeater logic, circuitry and/or code in the wireless access points.

Figure 2A:
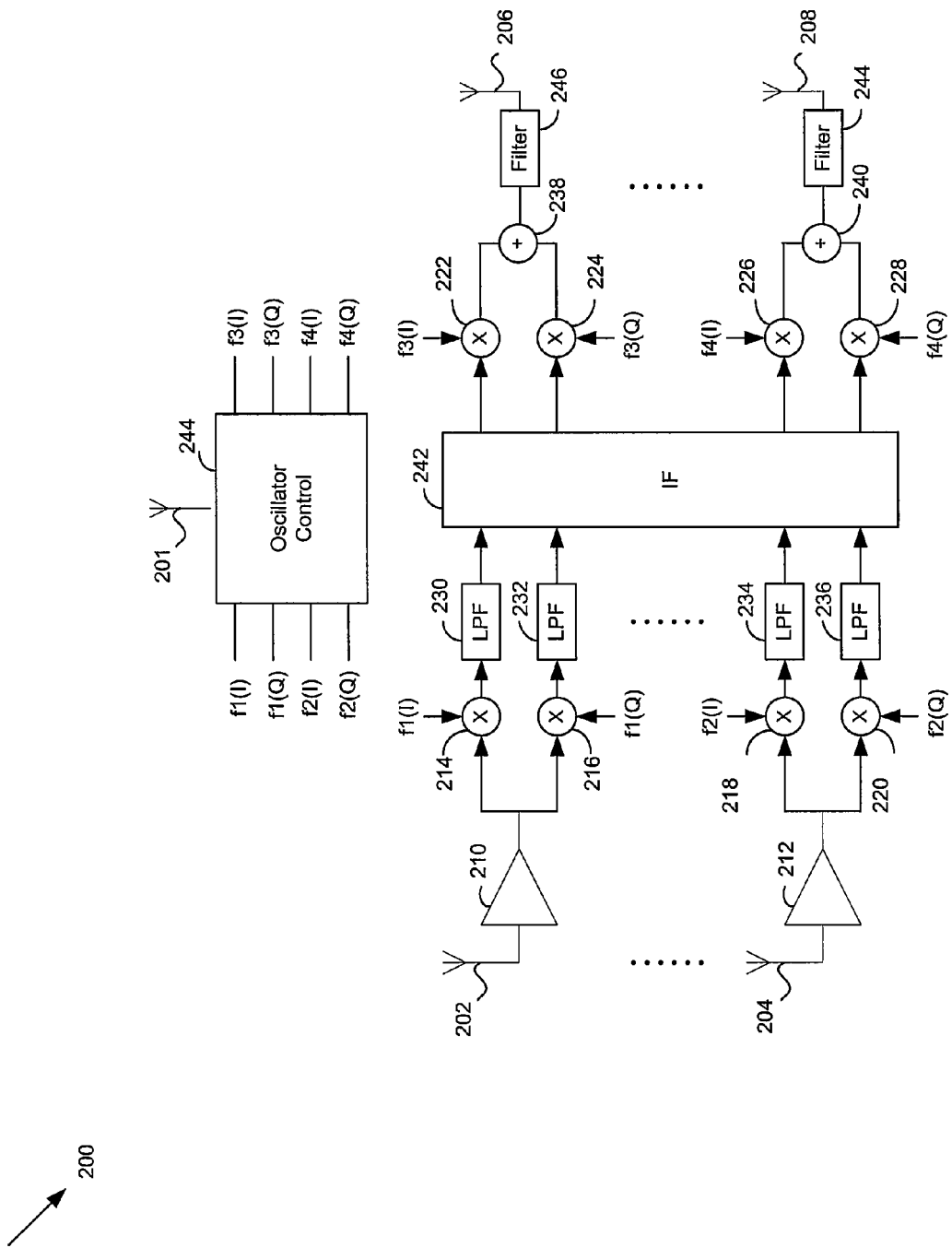
FIG. 2A is a circuit diagram illustrating an exemplary repeater architecture, in accordance with an embodiment of the invention.

FIG. 2A is a circuit diagram illustrating an exemplary repeater architecture 200, in accordance with an embodiment of the invention. Referring to FIG. 2A, there is shown an oscillator control 244, a plurality of antennas comprising antennas 201, 202, 204, 206, and 208; and a plurality of amplifiers 210 and 212 FIG. 2A also illustrates a plurality of multipliers comprising multipliers 214, 216, 218, 220, 222, 224, 226 and 228; a plurality of low-pass filters (LPFs) comprising LPF 230, 232, 234, and 236; and a plurality of filters comprising filters 246 and 244. The exemplary repeater architecture 200 may further comprise an intermediate frequency processing block 242 and a plurality of adders comprising adders 238 and 240 may be illustrated. There is also shown the oscillator signals f1(I), f1(Q), f2(I), f2(Q), f3(I), f3(Q), f4(I), and f4(Q), which may communicatively couple the oscillator control 244 to the plurality of multipliers 214 through 228. One or more of the exemplary components illustrated in FIG. 2A may be utilized without departing from the scope of various embodiments of the invention.

The oscillator control 244 may comprise suitable logic, circuitry and/or code that may be enabled to receive and transmit radio signals, for example from a control point 102, and may generate a plurality of oscillator frequencies that may be enabled to control the transmit modulation frequencies and receive demodulation frequencies at the multipliers 214, 216, 218, 220, 222, 224, 226, and 228, for example. The repeater 200 may, for example, be substantially similar to the access point 104. In this instance, the antenna 201 may receive the control signals from the control point 102 via the wireless connection 120b. The one or more antennas 202 to 204 may comprise suitable logic, circuitry and/or code that may be enabled to receive a data signal. In accordance with various embodiments of the invention, the antennas 202 through 204 may, for example, receive the wireless connection 120c from Access point 114. In some instances, there may a plurality of antennas, as illustrated in FIG. 2A. In another embodiment of the invention, there may be one receive antenna, for example, antenna 202.

The signal received at antennas 202 through 204 via, for example, wireless connection 120c, may be communicatively coupled to amplifiers 210 through 212. The amplifiers 210 and 212 may be similar, and may comprise suitable logic, circuitry, and or code that may be enabled to generate a low-noise amplified signal at the output that may be proportional to the input signal. The output signal of amplifier 210 may be communicatively coupled to the multipliers 214 and the multiplier 216. The multiplier 214 may demodulate the received signal to an intermediate frequency by multiplying with an in-phase carrier frequency f1(I). Hence, multiplier 214 may generate a signal comprising the in-phase component of the received signal. Similarly, the multiplier 216 may generate a signal comprising the quadrature component of the received signal, by multiplying the received signal with a quadrature carrier frequency f1(Q). The low-pass filters 230 and 232 may remove or significantly attenuate some undesirable frequencies. An intermediate in-phase frequency component from the output of the filter 230 may be communicatively coupled to the intermediate frequency processing block 242. Similarly, an intermediate quadrature frequency component from the output of the filter 232 may be communicatively coupled to the intermediate frequency processing block 242. Similarly, an intermediate in-phase frequency component and an intermediate quadrature frequency component may be generated from a signal received at antenna 204, via the multipliers 218 and 220, and the LPFs 234 and 236. In accordance with various embodiments of the invention, the transmit signals at the transmit antennas 206 through 208 may comply with multiple antenna transmission protocols, for example, beamforming, MIMO, or transmit diversity.

The intermediate frequency processing block 242 may comprise suitable logic, circuitry and/or code that may be enabled to process a plurality of intermediate frequency signals. For example, the intermediate frequency processing block 242 may suitably process the received signals for transmission via the one or more antennas 206 through 208. The intermediate frequency processing block 242 may generate an in-phase and a quadrature signal component for modulation and transmission via one or more transmit antennas. For example, a first in-phase signal component may be coupled from the intermediate frequency processing block 242 to the multiplier 222. The multiplier 222 may generate an in-phase RF signal component by multiplication of the signal from the intermediate frequency processing block 242 and an in-phase carrier frequency f3(I). Similarly, a quadrature RF signal component may be generated in multiplier 224 by multiplication of a signal from the intermediate frequency processing block 242 and a quadrature RF signal component f3(Q). The in-phase RF signal and the quadrature RF signal may be added in the adder 238, to form a composite RF signal. The filters, for example filter 246 may be used to attenuate undesirable frequencies, and the signal at the output of the filter 246 may be transmitted via antenna 206. Similarly, other intermediate frequency in-phase and quadrature signal components may be generated at the intermediate frequency processing block 242, and multiplied with in-phase and quadrature carrier frequencies at, for example, the multipliers 226 and 228 to generate a composite RF signal at the output of the adder 240 for transmission via antenna 208 and filter 244. In accordance with various embodiments of the invention, the adders 238 and 240 may perform a subtraction or an addition, and may weigh the signal components to be processed. In some instances, it may be desirable to adjust the phases of f1(I), f1(Q), f2(I), f2(Q), f3(I), f3(Q), f4(I), and f4(Q) to allow desirable signal selection.

By choosing desirable in-phase and quadrature modulation frequencies, for example f3(I) and f3(Q), the transmission frequency may be chosen differently from the receiver frequencies, thereby reducing interference. In accordance with network topology and/or one or more performance metrics, the oscillator control 244 may generate a desirable set of demodulation frequencies and modulation frequencies. In accordance with various embodiments of the invention, the above architecture may be used to receive one or more RF signals and re-transmit them at one or more RF frequencies, which may generally be different from the receive frequencies. In some instances, the transmit frequencies may be selected to be similar or equal to the receive frequencies.

In some instances, multiple antennas may permit multiple antenna processing of received signals, for example for beamforming or diversity reception and/or transmission. In other instances, each receive antenna and/or transmit antenna may receive/transmit a different frequency, so that multiple parallel single antenna repeater stations may be generated.

By transmitting control information, for example from the control point 102, to the access point repeater structures, for example, the oscillator control 244, desirable frequencies may be selected for receiving and transmitting frequencies. In some instances, the frequency band utilized for sending and receiving control information to the oscillator control 244 may be a different frequency band from the data transmission, for example Bluetooth or IEEE 802.11 Wireless LAN.

Figure 2B:
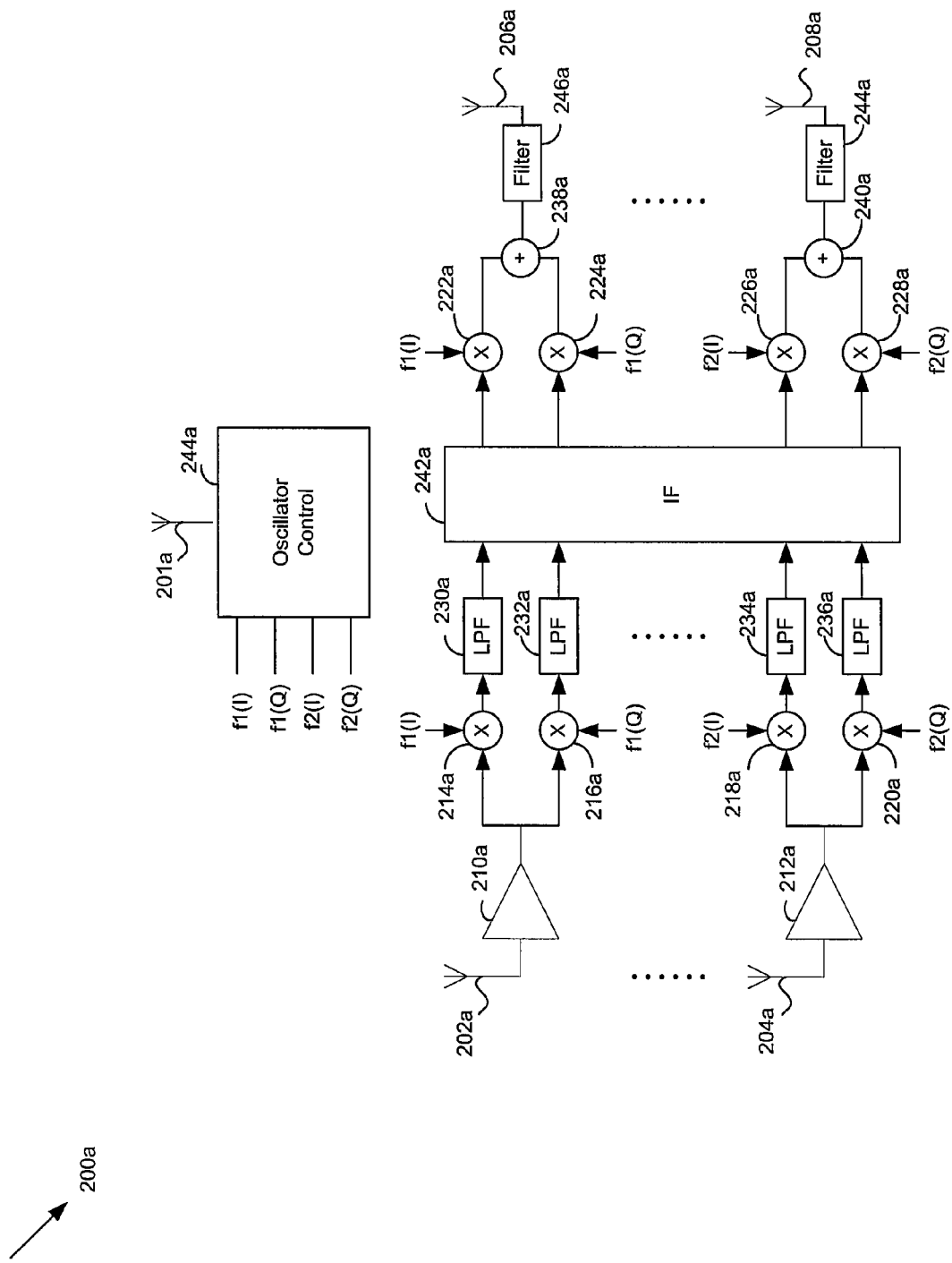
FIG. 2B is a circuit diagram illustrating an exemplary lower complexity repeater architecture, in accordance with an embodiment of the invention.

FIG. 2B is a circuit diagram illustrating an exemplary lower complexity repeater architecture 200a, in accordance with an embodiment of the invention. Referring to FIG. 2B, there is shown an oscillator control 244a, a plurality of antennas comprising antennas 201a, 202a, 204a, 206a, and 208a; and a plurality of amplifiers comprising amplifiers 210a and 212a. FIG. 2B also illustrated a plurality of multipliers comprising multipliers 214a, 216a, 218a, 220a, 222a, 224a, 226a and 228a, a plurality of low-pass filters (LPFs) comprising LPFs 230a, 232a, 234a, and 236; and a plurality of filters comprising filters 246a and 244a. The exemplary lower complexity repeater architecture may further comprise an intermediate frequency processing block 242; and a plurality of adders comprising adders 238 and 240. There is also shown the oscillator signals f1(I), f1(Q), f2(I), and f2(Q), which may communicatively couple the oscillator control 244a to the plurality of multipliers 214a through 228a. All the components in FIG. 2B may be similar to their corresponding components illustrated in FIG. 2A, except for the oscillator control 244a. For example, the LPF 230a may be substantially similar to the LPF 230. One or more of the exemplary components illustrated in FIG. 2B may be utilized without departing from the scope of various embodiments of the invention.

The operation of the repeater architecture in FIG. 2B may be substantially similar to the architecture illustrated in FIG. 2A, although the oscillator 244a may generate a reduced number of carrier frequencies. In some instances, it may be desirable to operate the modulator and/or the demodulator on a same frequency, in particular in instances where multiple parallel repeater stages may be operated. For example, a received signal at antenna 202a may be on a carrier frequency of 62 GHz and the modulation/demodulation frequencies f1(I) and f1(Q) may be 60 GHz. Hence, the intermediate frequency may be at 2 GHz, for example. After modulation and suitable filtering in the multipliers 222a, 224a, the adder 238a and the filter 246a, the transmitted signal may be at a frequency of 60 GHz−2 GHz=58 GHz. This may be achieved by suitable selection of the modulation band generated in the adder 238a and the multipliers 222a and 224a. In accordance with various embodiments of the invention, the adders 238a and 240a may perform a subtraction or an addition, and may weigh the signal components to be processed. In some instances, it may be desirable to adjust the phases of f1(I), f1(Q), f2(I), and f2(Q) to allow desirable signal selection.

Figure 3:
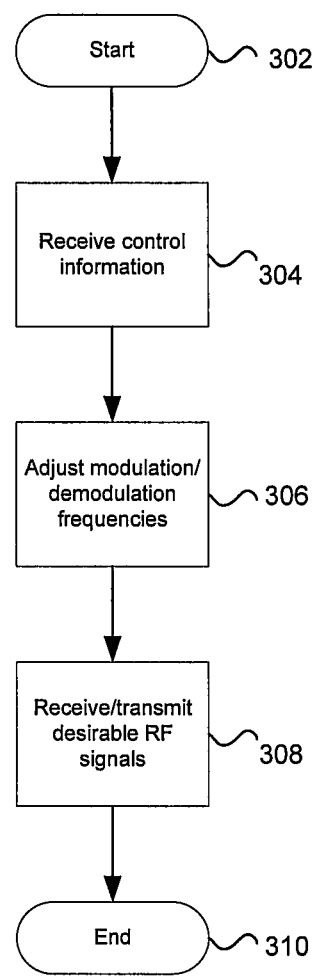
FIG. 3 is a flow chart illustrating an exemplary frequency adjustment process, in accordance with an embodiment of the invention.

FIG. 3 is a flow chart illustrating exemplary frequency adjustment steps, in accordance with an embodiment of the invention. The exemplary steps may begin with start step 302. In step 304, an access point, for example access point 104, may receive control information from another access point, or from a control point 102 in step 304. The control information may typically be broadcast on a different frequency from those used for data communications. For example, the data communication between the access points may be in the 60 GHz band, and the control information may be transmitted in the 5 GHz band. The access point may comprise the repeater architecture 200. The control signals may, for example, be received via antenna 201 and may be processed in the oscillator control 244. In step 306, the oscillator control 244 may adjust the modulation and demodulation frequencies of the repeater architecture 200 via the in-phase and quadrature carrier frequencies. In some instances, the frequency selection may be based on some performance measure, in other instances, the frequency selection may be made in a centralized manner directly at, for example, the control point 102. By setting the demodulation and modulation frequencies to desirable values, the transmission and/or reception frequencies may be set to desirable values. In most instances, the transmission frequencies may be different from the reception frequencies. In step 308, after the setup, in the preceding steps, the receiving and transmitting may be performed in accordance with various embodiments of the invention.

In accordance with an embodiment of the invention, a method and system for sharing modulation information between multiple access points may comprise receiving modulation control information and demodulation control information at an access point, for example access point 104, comprising one or more receivers and one or more transmitters, as illustrated in FIG. 2A and FIG. 2B. One or more modulation frequencies, for example f3(I), f3(Q), f4(I), and f4(Q), may be adjusted and utilized to generate transmit signals by the one or more transmitters based on the received modulation control information, as illustrated in FIG. 2A. One or more demodulation frequencies, for example f1(I), f1(Q), f2(I), and f2(Q), may be adjusted and utilized to generate intermediate frequency signals by the one or more receivers based on the received demodulation control information, as described for FIG. 2A.

The modulation control information and the demodulation control information may be received via a control point, for example control point 102. The modulation control information and demodulation control information may be received on a link, for example link 120b, operating in a frequency band different from said transmit frequencies and said receive frequencies, which may be, for example, wireless links 120c and 120e. The frequency band of the link 120b, for example, may be Bluetooth or a IEEE 802.11 Wireless Link. One or more of the one or more modulation frequencies and the one or more demodulation frequencies may be substantially similar. For example, f1(I) may be substantially similar to f3(I). The transmit frequencies and the receive frequencies may be in the 60 GHz band. A plurality of the intermediate frequency signals received via a plurality of antennas, for example antennas 202 through 204, may be combined, for example in the intermediate frequency processing block 242. Intermediate frequency signals may be generated, for example in the intermediate frequency processing block 242, for the one or more transmitters in accordance with multiple antenna transmission protocols. This may include MIMO, beamforming and/or transmission diversity protocols. Radio frequency interference may be reduced during the adjustment of the receive frequencies and the adjustment of the transmit frequencies.

Another embodiment of the invention may provide a machine-readable storage, having stored thereon, a computer program having at least one code section executable by a machine, thereby causing the machine to perform the steps as described herein for a method and system for sharing modulation information between multiple access points.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, said method comprising:
   receiving modulation control information including one or more desired modulation frequencies and demodulation control information including one or more desired demodulation frequencies over a wireless link at an access point comprising one or more receivers and one or more transmitters;
   adjusting one or more modulation frequencies to said one or more desired modulation frequencies utilized to generate transmit signals by said one or more transmitters based on said received modulation control information;
   adjusting one or more demodulation frequencies to said one or more desired demodulation frequencies utilized to generate intermediate frequency signals by said one or more receivers based on said received demodulation control information;
   wherein said modulation control information and demodulation control information are received via an antenna in a frequency band different from said one or more modulation frequencies, said one or more demodulation frequencies, a frequency of said transmit signals, and a frequency of data signals received via another antenna of each of said one or more receivers.

2. The method according to claim 1, comprising receiving said modulation control information and said demodulation control information via a control point.

3. The method according to claim 1, whereas said frequency band of said wireless link is a Bluetooth or IEEE 802.11 Wireless LAN link.

4. The method according to claim 1, whereas one or more of said one or more modulation frequencies and said one or more demodulation frequencies are substantially similar.

5. The method according to claim 1, whereas said transmit frequencies and said receive frequencies are in the 60 GHz band.

6. The method according to claim 1, comprising combining a plurality of said intermediate frequency signals received via a plurality of antennas.

7. The method according to claim 1, comprising generating intermediate frequency signals for said one or more transmitters in accordance with multiple antenna transmission protocols.

8. The method according to claim 1, comprising reducing radio frequency interference during said adjustment of said receive frequencies.

9. The method according to claim 1, comprising reducing radio frequency interference during said adjustment of said transmit frequencies.

10. A system for processing communication signals, said system comprising:
   one or more circuits configured to:
      receive modulation control information including one or more desired modulation frequencies and demodulation control information including one or more desired demodulation frequencies over a wireless link at an access point comprising one or more receivers and one or more transmitters;
      adjust one or more modulation frequencies to said one or more desired modulation frequencies utilized to generate transmit signals by said one or more transmitters based on said received modulation control information;

adjust one or more demodulation frequencies to said one or more desired demodulation frequencies utilized to generate intermediate frequency signals by said one or more receivers based on said received demodulation control information, wherein said one or more circuits receive said modulation control information and demodulation control information via an antenna in a frequency band different from said one or more modulation frequencies, said one or more demodulation frequencies, a frequency of said transmit signals, and a frequency of data signals received via another antenna of each of said one or more receivers.

11. The system according to claim 10, wherein said one or more circuits receive said modulation control information and said demodulation control information via a control point.

12. The system according to claim 10, whereas said frequency band of said wireless link is a Bluetooth or IEEE 802.11 Wireless LAN link.

13. The system according to claim 10, whereas one or more of said one or more modulation frequencies and said one or more demodulation frequencies are substantially similar.

14. The system according to claim 10, whereas said transmit frequencies and said receive frequencies are in the 60 GHz band.

15. The system according to claim 10, wherein said one or more circuits combine a plurality of said intermediate frequency signals received via a plurality of antennas.

16. The system according to claim 10, wherein said one or more circuits generate intermediate frequency signals for said one or more transmitters in accordance with multiple antenna transmission protocols.

17. The system according to claim 10, wherein said one or more circuits reduce radio frequency interference during said adjustment of said receive frequencies.

18. The system according to claim 10, wherein said one or more circuits reduce radio frequency interference during said adjustment of said transmit frequencies.

19. An access point for processing communication signals, said access point comprising:

a processor that operates to:

receive modulation control information including one or more desired modulation frequencies and demodulation control information including one or more desired demodulation frequencies via a Bluetooth link;

adjust a transmitter frequency based on said received modulation control information, thereby enabling a reduction in transmitted radio frequency interference; and adjust a receiver frequency based on said received demodulation control information thereby enabling a reduction in received radio frequency interference;

wherein each of a frequency of said Bluetooth link received via an antenna of said access point, said transmitter frequency, and said receiver frequency of data signals received via another antenna of said access point is different.

* * * * *